US009251736B2

(12) United States Patent
Lin et al.

(10) Patent No.: US 9,251,736 B2
(45) Date of Patent: Feb. 2, 2016

(54) MULTIPLE VOLTAGE LEVEL DRIVING FOR ELECTROPHORETIC DISPLAYS

(71) Applicant: SiPix Imaging, Inc., Fremont, CA (US)

(72) Inventors: Craig Lin, San Jose, CA (US); Tin Pham, San Jose, CA (US); Bryan Chan, San Francisco, CA (US); Manasa Peri, Milpitas, CA (US); Ming Wang, Fremont, CA (US); Yu Li, Fremont, CA (US); Hui Du, Milpitas, CA (US); Xiaojia Zhang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 218 days.

(21) Appl. No.: 13/893,265

(22) Filed: May 13, 2013

(65) Prior Publication Data

US 2013/0300727 A1 Nov. 14, 2013

Related U.S. Application Data

(63) Continuation-in-part of application No. 12/695,817, filed on Jan. 28, 2010, now abandoned, and a continuation-in-part of application No. 13/875,145, filed on May 1, 2013, now Pat. No. 8,964,282, which is a continuation-in-part of application No. 13/633,788, filed on Oct. 2, 2012, now Pat. No. 8,717,664.

(60) Provisional application No. 61/148,746, filed on Jan. 30, 2009.

(51) Int. Cl.

| | |
|---|---|
| ***G09G 3/34*** | (2006.01) |
| ***G09G 3/32*** | (2006.01) |
| *G02F 1/167* | (2006.01) |
| *G09G 3/20* | (2006.01) |

(52) U.S. Cl.

CPC .............. *G09G 3/3291* (2013.01); *G09G 3/344* (2013.01); *G02F 1/167* (2013.01); *G09G 3/2003* (2013.01); *G09G 3/2011* (2013.01); *G09G 2310/06* (2013.01)

(58) Field of Classification Search

CPC ...................................................... G09G 3/344
USPC .................................. 345/107; 359/228, 296
See application file for complete search history.

(56) References Cited

U.S. PATENT DOCUMENTS 3,756,693 A 9/1973 Ota
3,892,568 A 7/1975 Ota
(Continued)

FOREIGN PATENT DOCUMENTS

WO WO 99/53373 10/1999

OTHER PUBLICATIONS

U.S. Appl. No. 13/370,186, filed Feb. 9, 2012, Wang et al.
(Continued)

*Primary Examiner* — Jimmy H Nguyen
*Assistant Examiner* — Hang Lin
(74) *Attorney, Agent, or Firm* — Perkins Coie LLP

(57) ABSTRACT

This application is directed to driving methods for electrophoretic displays. The driving methods comprise applying different voltages selected from multiple voltage levels, to pixel electrodes and optionally also to the common electrodes. In one embodiment, the different voltages are selected from a group consisting of 0V, at least two levels of positive voltage and at least two levels of negative voltage. The driving method is also suitable for a color display device.

8 Claims, 6 Drawing Sheets

(56) References Cited

U.S. PATENT DOCUMENTS

| | | | |
|---|---|---|---|
| 4,143,947 | A | 3/1979 | Aftergut et al. |
| 4,259,694 | A | 3/1981 | Liao |
| 4,298,448 | A | 11/1981 | Muller et al. |
| 4,443,108 | A | 4/1984 | Webster |
| 4,568,975 | A | 2/1986 | Harshbarger et al. |
| 4,575,124 | A | 3/1986 | Morrison et al. |
| 5,266,937 | A | 11/1993 | DiSanto et al. |
| 5,298,993 | A | 3/1994 | Edgar et al. |
| 5,378,574 | A | 1/1995 | Winnik et al. |
| 5,754,584 | A | 5/1998 | Durrant et al. |
| 5,831,697 | A | 11/1998 | Evanicky et al. |
| 5,923,315 | A | 7/1999 | Ueda et al. |
| 5,926,617 | A | 7/1999 | Ohara et al. |
| 5,980,719 | A | 11/1999 | Cherukuri et al. |
| 6,005,890 | A | 12/1999 | Clow et al. |
| 6,045,756 | A | 4/2000 | Carr et al. |
| 6,069,971 | A | 5/2000 | Kanno et al. |
| 6,075,506 | A | 6/2000 | Bonnett et al. |
| 6,111,248 | A | 8/2000 | Melendez et al. |
| 6,154,309 | A | 11/2000 | Otani et al. |
| 6,198,809 | B1 | 3/2001 | Disanto et al. |
| 6,337,761 | B1 | 1/2002 | Rogers et al. |
| 6,373,461 | B1 | 4/2002 | Hasegawa et al. |
| 6,486,866 | B1 | 11/2002 | Kuwahara et al. |
| 6,504,524 | B1 | 1/2003 | Gates et al. |
| 6,517,618 | B2 | 2/2003 | Foucher et al. |
| 6,525,866 | B1 | 2/2003 | Lin et al. |
| 6,532,008 | B1 | 3/2003 | Guranlnick |
| 6,538,801 | B2 | 3/2003 | Jacobson et al. |
| 6,600,534 | B1 | 7/2003 | Tanaka et al. |
| 6,639,580 | B1 | 10/2003 | Kishi et al. |
| 6,650,462 | B2 | 11/2003 | Katase |
| 6,657,612 | B2 | 12/2003 | Machida et al. |
| 6,671,081 | B2 | 12/2003 | Kawai |
| 6,674,561 | B2 | 1/2004 | Ohnishi et al. |
| 6,680,726 | B2 | 1/2004 | Gordon et al. |
| 6,686,953 | B1 | 2/2004 | Holmes |
| 6,693,620 | B1 | 2/2004 | Herb et al. |
| 6,704,133 | B2 | 3/2004 | Gates et al. |
| 6,724,521 | B2 | 4/2004 | Nakao et al. |
| 6,729,718 | B2 | 5/2004 | Goto et al. |
| 6,751,007 | B2 | 6/2004 | Liang et al. |
| 6,760,059 | B2 | 7/2004 | Ham |
| 6,796,698 | B2 | 9/2004 | Sommers et al. |
| 6,829,078 | B2 | 12/2004 | Liang et al. |
| 6,864,875 | B2 | 3/2005 | Drzaic et al. |
| 6,903,716 | B2 | 6/2005 | Kawabe et al. |
| 6,914,713 | B2 | 7/2005 | Chung et al. |
| 6,967,762 | B2 | 11/2005 | Machida et al. |
| 6,970,155 | B2 | 11/2005 | Cabrera |
| 6,987,503 | B2 | 1/2006 | Inoue |
| 6,987,605 | B2 | 1/2006 | Liang et al. |
| 6,995,550 | B2 | 2/2006 | Jacobson et al. |
| 7,009,756 | B2 | 3/2006 | Kishi et al. |
| 7,012,600 | B2 | 3/2006 | Zehner et al. |
| 7,019,889 | B2 | 3/2006 | Katase |
| 7,038,655 | B2 | 5/2006 | Herb et al. |
| 7,046,228 | B2 | 5/2006 | Liang et al. |
| 7,177,066 | B2 | 2/2007 | Chung et al. |
| 7,184,196 | B2 | 2/2007 | Ukigaya |
| 7,226,550 | B2 | 6/2007 | Hou et al. |
| 7,242,514 | B2 | 7/2007 | Chung et al. |
| 7,259,744 | B2 | 8/2007 | Arango et al. |
| 7,277,074 | B2 | 10/2007 | Shih |
| 7,283,199 | B2 | 10/2007 | Aichi et al. |
| 7,307,779 | B1 | 12/2007 | Cernasov et al. |
| 7,312,794 | B2 | 12/2007 | Zehner et al. |
| 7,342,556 | B2 | 3/2008 | Oue et al. |
| 7,349,146 | B1 | 3/2008 | Douglass et al. |
| 7,352,353 | B2 | 4/2008 | Albert et al. |
| 7,365,732 | B2 | 4/2008 | Matsuda et al. |
| 7,397,289 | B2 | 7/2008 | Kojima |
| 7,411,719 | B2 | 8/2008 | Paolini et al. |
| 7,417,787 | B2 | 8/2008 | Chopra et al. |
| 7,420,549 | B2 | 9/2008 | Jacobson et al. |
| 7,443,466 | B2 | 10/2008 | Dedene et al. |
| 7,446,749 | B2 | 11/2008 | Lee et al. |
| 7,474,295 | B2 | 1/2009 | Matsuda |
| 7,495,651 | B2 | 2/2009 | Zhou et al. |
| 7,504,050 | B2 | 3/2009 | Weng et al. |
| 7,545,557 | B2 | 6/2009 | Iftime et al. |
| 7,548,291 | B2 | 6/2009 | Lee et al. |
| 7,607,106 | B2 | 10/2009 | Ernst et al. |
| 7,639,849 | B2 | 12/2009 | Kimpe et al. |
| 7,679,599 | B2 | 3/2010 | Kawai |
| 7,686,463 | B2 | 3/2010 | Goto |
| 7,701,423 | B2 | 4/2010 | Suwabe et al. |
| 7,701,436 | B2 | 4/2010 | Miyasaka |
| 7,710,376 | B2 | 5/2010 | E do et al. |
| 7,733,311 | B2 | 6/2010 | Amundson et al. |
| 7,760,419 | B2 | 7/2010 | Lee |
| 7,773,069 | B2 | 8/2010 | Miyasaka et al. |
| 7,786,974 | B2 | 8/2010 | Zhou et al. |
| 7,791,717 | B2 | 9/2010 | Cao et al. |
| 7,792,398 | B2 | 9/2010 | Tanaka et al. |
| 7,800,580 | B2 | 9/2010 | Johnson et al. |
| 7,804,483 | B2 | 9/2010 | Zhou et al. |
| 7,808,696 | B2 | 10/2010 | Lee et al. |
| 7,830,592 | B1 | 11/2010 | Sprague et al. |
| 7,839,381 | B2 | 11/2010 | Zhou et al. |
| 7,868,874 | B2 | 1/2011 | Reynolds |
| 7,911,444 | B2 | 3/2011 | Yee |
| 7,911,681 | B2 | 3/2011 | Ikegami et al. |
| 7,952,558 | B2 | 5/2011 | Yang et al. |
| 7,982,941 | B2 | 7/2011 | Lin et al. |
| 7,995,029 | B2 | 8/2011 | Johnson |
| 7,999,787 | B2 | 8/2011 | Amundson et al. |
| 8,018,450 | B2 | 9/2011 | Kimura et al. |
| 8,035,611 | B2 | 10/2011 | Sakamoto |
| 8,044,927 | B2 | 10/2011 | Inoue |
| 8,054,253 | B2 | 11/2011 | Yoo |
| 8,072,675 | B2 | 12/2011 | Lin et al. |
| 8,115,729 | B2 | 2/2012 | Danner et al. |
| 8,120,838 | B2 | 2/2012 | Lin et al. |
| 8,125,501 | B2 | 2/2012 | Amundson et al. |
| 8,159,636 | B2 | 4/2012 | Sun et al. |
| 8,164,823 | B2 | 4/2012 | Ikegami et al. |
| 8,169,690 | B2 | 5/2012 | Lin et al. |
| 8,228,289 | B2 | 7/2012 | Nagasaki |
| 8,237,892 | B1 | 8/2012 | Sprague et al. |
| 8,243,013 | B1 | 8/2012 | Sprague et al. |
| 8,274,472 | B1 | 9/2012 | Wang et al. |
| 8,334,836 | B2 | 12/2012 | Kanamori et al. |
| 8,395,836 | B2 | 3/2013 | Lin et al. |
| 8,422,116 | B2 | 4/2013 | Sprague et al. |
| 8,462,102 | B2 | 6/2013 | Wong et al. |
| 2003/0193565 | A1 | 10/2003 | Wen et al. |
| 2004/0227746 | A1* | 11/2004 | Shih .............................. 345/204 |
| 2004/0246562 | A1 | 12/2004 | Chung et al. |
| 2004/0263947 | A1 | 12/2004 | Drzaic et al. |
| 2005/0179642 | A1 | 8/2005 | Wilcox et al. |
| 2006/0132426 | A1 | 6/2006 | Johnson |
| 2006/0164405 | A1 | 7/2006 | Zhou |
| 2006/0202949 | A1* | 9/2006 | Danner et al. ................ 345/107 |
| 2007/0035510 | A1 | 2/2007 | Zhou et al. |
| 2007/0052668 | A1 | 3/2007 | Zhou et al. |
| 2007/0070032 | A1 | 3/2007 | Chung et al. |
| 2007/0080926 | A1 | 4/2007 | Zhou et al. |
| 2007/0080928 | A1 | 4/2007 | Ishii et al. |
| 2007/0103427 | A1 | 5/2007 | Zhou et al. |
| 2007/0132687 | A1 | 6/2007 | Johnson |
| 2007/0200874 | A1* | 8/2007 | Amundson et al. ........... 345/690 |
| 2007/0247417 | A1 | 10/2007 | Miyazaki et al. |
| 2007/0262949 | A1 | 11/2007 | Zhou et al. |
| 2007/0268563 | A1* | 11/2007 | Tam et al. ..................... 359/296 |
| 2008/0042928 | A1 | 2/2008 | Schlangen et al. |
| 2008/0150886 | A1 | 6/2008 | Johnson et al. |
| 2008/0174531 | A1 | 7/2008 | Ash |
| 2008/0303780 | A1 | 12/2008 | Sprague et al. |
| 2009/0096745 | A1 | 4/2009 | Sprague et al. |
| 2010/0103502 | A1 | 4/2010 | Jacobson et al. |
| 2010/0134538 | A1 | 6/2010 | Sprague et al. |
| 2010/0165005 | A1 | 7/2010 | Sprague |
| 2010/0165448 | A1 | 7/2010 | Sprague |

(56) References Cited

U.S. PATENT DOCUMENTS

| | | | |
|---|---|---|---|
| 2010/0194733 | A1 | 8/2010 | Lin et al. |
| 2010/0194789 | A1 | 8/2010 | Lin et al. |
| 2010/0238203 | A1 | 9/2010 | Stroemer et al. |
| 2010/0283804 | A1 | 11/2010 | Sprague et al. |
| 2010/0295880 | A1 | 11/2010 | Sprague et al. |
| 2011/0096104 | A1 | 4/2011 | Sprague et al. |
| 2011/0175875 | A1 | 7/2011 | Lin et al. |
| 2011/0175945 | A1 | 7/2011 | Lin |
| 2011/0216104 | A1 | 9/2011 | Chan et al. |
| 2011/0217639 | A1 | 9/2011 | Sprague |
| 2011/0261433 | A1 | 10/2011 | Sprague et al. |
| 2011/0292094 | A1 | 12/2011 | Lin |
| 2011/0298776 | A1 | 12/2011 | Lin |
| 2012/0007897 | A1 | 1/2012 | Yang et al. |
| 2012/0120122 | A1 | 5/2012 | Lin et al. |
| 2012/0274671 | A1 | 11/2012 | Sprague et al. |
| 2012/0307346 | A1 | 12/2012 | Sprague |
| 2012/0320017 | A1 | 12/2012 | Sprague et al. |
| 2013/0057463 | A1 | 3/2013 | Zhang et al. |
| 2013/0057942 | A1 | 3/2013 | Wang et al. |

OTHER PUBLICATIONS

U.S. Appl. No. 13/551,541, filed Jul. 17, 2012, Yang et al.

U.S. Appl. No. 13/633,788, filed Oct. 2, 2012, Wang et al.

U.S. Appl. No. 13/875,145, filed May 1, 2013, Wang et al.

Kao, WC., Fang, CY., Chen, YY., Shen, MH., and Wong, J. (Jan. 2008) Integrating Flexible Electrophoretic Display and One-Time Password Generator in Smart Cards. *ICCE 2008 Digest of Technical Papers*, p. 4-3. (Int'l Conference on Consumer Electronics, Jan. 9-13.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.

Sprague, R.A. (May 18, 2011) *Active Matrix Displays for e-Readers Using Microcup Electrophoretics.* Presentation conducted at SID 2011, 49 Int'l Symposium, Seminar and Exhibition, May 15-May 20, 2011, Los Angeles Convention Center, Los Angeles, CA, USA.

* cited by examiner

Pixel Electrode

Common Electrode

| | -15V | -10V | -5V | 0V | +5V | +10V | +15V |
|---|---|---|---|---|---|---|---|
| -15V | 0V | +5V | +10V | +15V | +20V | +25V | +30V |
| -10V | -5V | 0V | +5V | +10V | +15V | +20V | +25V |
| -5V | -10V | -5V | 0V | +5V | +10V | +15V | +20V |
| 0V | -15V | -10V | -5V | 0V | +5V | +10V | +15V |
| +5V | -20V | -15V | -10V | -5V | 0V | +5V | +10V |
| +10V | -25V | -20V | -15V | -10V | -5V | 0V | +5V |
| +15V | -30V | -25V | -20V | -15V | -10V | -5V | 0V |

Figure 4

MULTIPLE VOLTAGE LEVEL DRIVING FOR ELECTROPHORETIC DISPLAYS

This application is a continuation-in-part of U.S. application Ser. No. 12/695,817, filed Jan. 28, 2010; which claims the benefit of U.S. Provisional Application 61/148,746, filed Jan. 30, 2009. This application and is also a continuation-in-part of U.S. application Ser. No. 13/875,145, filed May 1, 2013; which is a continuation-in-part of U.S. application Ser. No. 13/633,788, filed Oct. 2, 2012. The above-identified applications are incorporated herein by reference in their entirety.

TECHNICAL FIELD

The present invention relates to methods comprising applying a voltage selected from multiple voltage levels to drive an electrophoretic display. The methods are also suitable for driving a color display device.

BACKGROUND OF THE INVENTION

An electrophoretic display (EPD) is a non-emissive device based on the electrophoresis phenomenon of charged pigment particles suspended in a solvent. The display usually comprises two plates with electrodes placed opposing each other. One of the electrodes is usually transparent. A suspension composed of a colored solvent and charged pigment particles is enclosed between the two plates. When a voltage difference is imposed between the two electrodes, the pigment particles migrate to one side or the other, according to the polarity of the voltage difference. As a result, either the color of the pigment particles or the color of the solvent may be seen at the viewing side. An EPD may be driven by a uni-polar or bi-polar approach.

However, the driving methods currently available pose a restriction on the number of grayscale outputs. This is due to the fact that display driver ICs and display controllers are limited in speed on the minimum pulse length that a waveform can have. While current active matrix display architectures utilize ICs that can generate pulse lengths down to 8 msec leading to electrophoretic displays which have shortened response time, even below 150 msec, the grayscale resolution seems to diminish due to the incapability of the system to generate shorter pulse lengths.

In addition, the driving methods currently available are not sufficient for driving a color display device.

SUMMARY OF THE INVENTION

The present invention is directed to methods for driving an electrophoretic display, which method comprises applying different voltages selected from multiple voltage levels, to pixel electrodes and optionally also to the common electrode.

More specifically, the driving method for the display device comprising an array of pixels wherein each of said pixels is sandwiched between a common electrode and a pixel electrode, which method comprises applying a voltage to the pixel electrode which voltage is selected from the group consisting of at least four different levels of voltage.

The method allows for multiple voltage levels, specifically, 0 volt, at least two levels of positive voltage and at least two levels of negative voltage.

The method can provide finer control over the driving waveforms and produce a better grayscale resolution.

The first aspect of the invention is directed to a driving method for a display device comprising an array of display cells wherein each of said display cells is sandwiched between a common electrode and a pixel electrode, which method comprises applying different voltages selected from a group consisting of 0V, at least two levels of positive voltage and at least two levels of negative voltage, to the pixel electrode. In one embodiment, the different voltages are selected from a group consisting of 0V, three levels of positive voltage and three levels of negative voltage. In one embodiment, the different voltages are selected from a group consisting of 0V, −5V, −10V, −15V, +5V, +10V and +15V. In one embodiment, the voltage applied to the common electrode remains constant. In another embodiment, the method further comprises applying different voltages selected from a group consisting of 0V, at least two levels of positive voltage and at least two levels of negative voltage, to the common electrode. The different voltages applied to the common electrode are selected from a group consisting of 0V, three levels of positive voltage and three levels of negative voltage. In one embodiment, the different voltages applied to the common electrode are selected from a group consisting of 0V, −5V, −10V, −15V, +5V, +10V and +15V. In one embodiment, the display device is an electrophoretic display device.

The second aspect of the present invention is directed to a driving method for a color display device. The color display device comprises an electrophoretic fluid, which fluid comprises a first type of pigment particles, a second type of pigment particles and a third type of pigment particles, all of which are dispersed in a solvent or solvent mixture, wherein (a) the first type of pigment particles and the second type of pigment particles carry opposite charge polarities;

(b) the third type of pigment particles has the same charge polarity as the second type of pigment particles but at a lower intensity; and (c) the second type of pigment particles has a threshold voltage.

The driving method for the color display device comprises applying a voltage selected from the group consisting of (i) 0 volt, (ii) a high positive voltage, (iii) a high negative voltage and (iv) a low positive voltage or a low negative voltage, to a pixel electrode.

BRIEF DESCRIPTION OF THE DRAWINGS

FIG. 4 is a table which shows the possible voltage combinations in a method of the present invention.

DETAILED DESCRIPTION OF THE INVENTION

Figure 1:
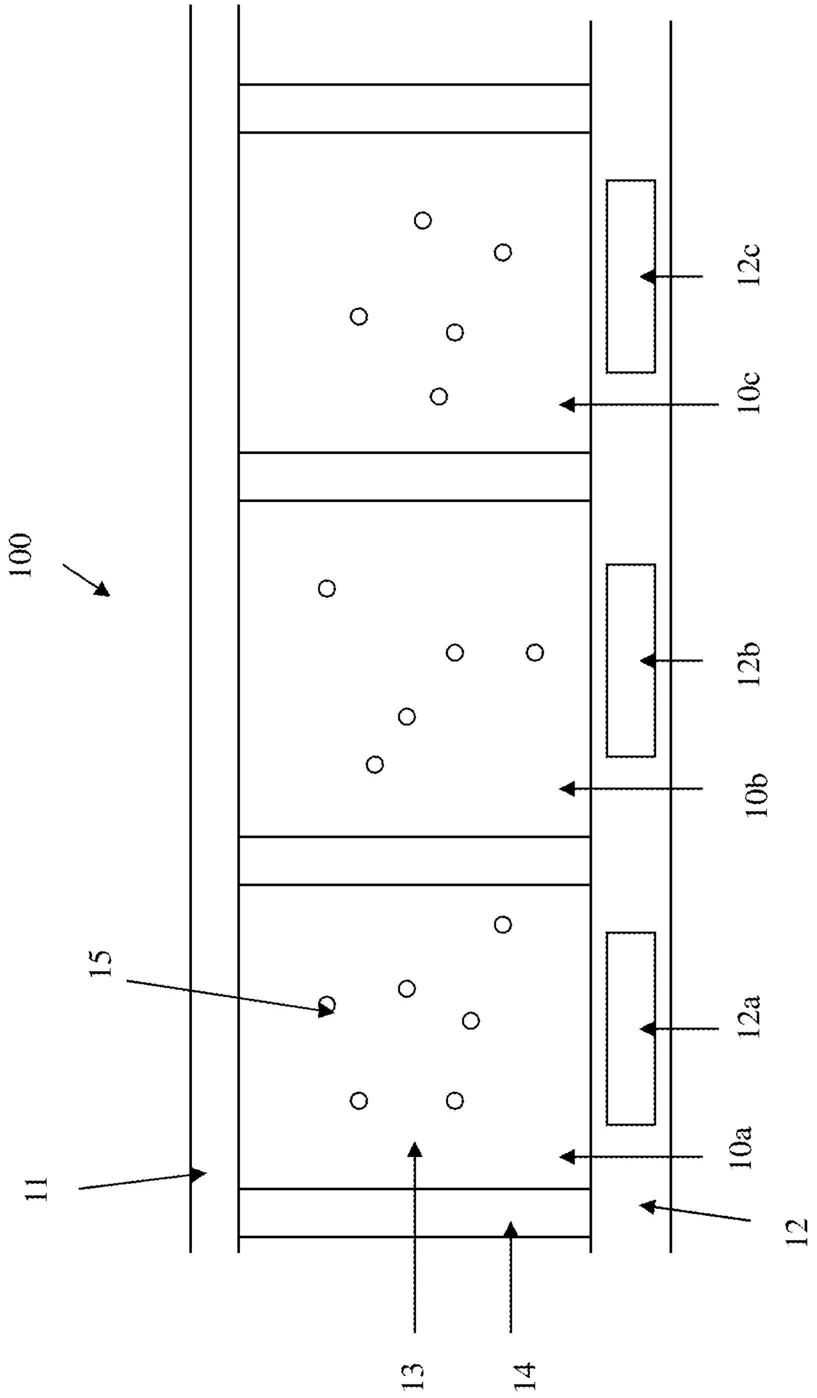
FIG. 1 is a cross-section view of a typical electrophoretic display device.

FIG. 1 illustrates a typical array of electrophoretic display cells 10*a*, 10*b* and 10*c* in a multi-pixel display 100 which may be driven by any of the driving methods presented herein. In FIG. 1, the electrophoretic display cells 10*a*, 10*b*, 10*c*, on the front viewing side, are provided with a common electrode 11 (which is usually transparent). On the opposing side (i.e., the rear side) of the electrophoretic display cells 10*a*, 10*b* and 10*c*, a substrate (12) includes discrete pixel electrodes 12*a*, 12*b* and 12*c*, respectively. Each of the pixel electrodes 12*a*, 12*b* and 12*c* defines an individual pixel of the multi-pixel electrophoretic display 100, in FIG. 1. However, in practice, a plurality of display cells (as a pixel) may be associated with one discrete pixel electrode. The pixel electrodes 12*a*, 12*b*, 12*c* may be segmented in nature rather than pixellated, defining regions of an image to be displayed rather than individual pixels. Therefore, while the term "pixel" or "pixels" is frequently used in this disclosure to illustrate driving implementations, the driving implementations are also applicable to segmented displays.

An electrophoretic fluid 13 is filled in each of the electrophoretic display cells 10*a*, 10*b*, 10*c*. Each of the electrophoretic display cells 10*a*, 10*b*, 10*c* is surrounded by display cell walls 14.

The movement of the charged particles in a display cell is determined by the voltage potential difference applied to the common electrode and the pixel electrode associated with the display cell.

As an example, the charged particles 15 may be positively charged so that they will be drawn to a pixel electrode (12*a*, 12*b* or 12*c*) or the common electrode 11, whichever is at an opposite voltage potential from that of charged particles 15. If the same polarity is applied to the pixel electrode and the common electrode in a display cell, the positively charged pigment particles will then be drawn to the electrode which has a lower voltage potential.

In another embodiment, the charged pigment particles 15 may be negatively charged.

The charged particles 15 may be white. Also, as would be apparent to a person having ordinary skill in the art, the charged particles may be dark in color and are dispersed in an electrophoretic fluid 13 that is light in color to provide sufficient contrast to be visually discernable.

The electrophoretic display 100 could also be made with a transparent or lightly colored electrophoretic fluid 13 and charged particles 15 having two different colors carrying opposite particle charges, and/or having differing electrokinetic properties.

The electrophoretic display cells 10*a*, 10*b*, 10*c* may be of a conventional walled or partition type, a microencapsulted type or a microcup type. In the microcup type, the electrophoretic display cells 10*a*, 10*b*, 10*c* may be sealed with a top sealing layer. There may also be an adhesive layer between the electrophoretic display cells 10*a*, 10*b*, 10*c* and the common electrode 11.

Figure 2:
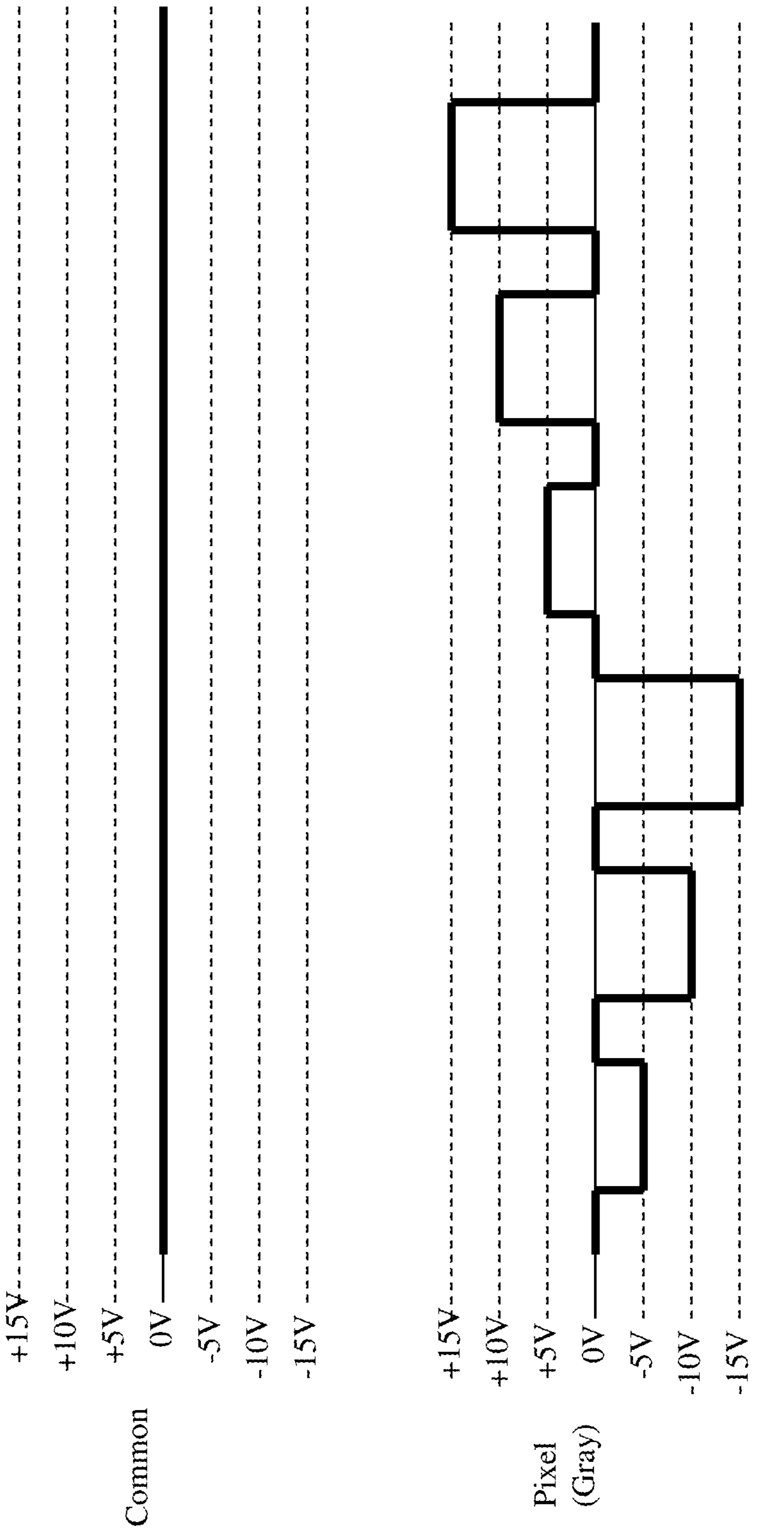
FIG. 2 illustrates an example of a driving method of the present invention.

FIG. 2 shows a driving method of the present invention. In this example, the voltage applied to the common electrode remains constant at the 0 volt. The voltages applied to the pixel electrode, however, fluctuates between −15V, −10V, −5V, 0V, +5V, +10V and +15V. As a result, the charged particles associated with the pixel electrode would sense a voltage potential of −15V, −10V, −5V, 0V, +5V, +10V or +15V.

Figure 3:
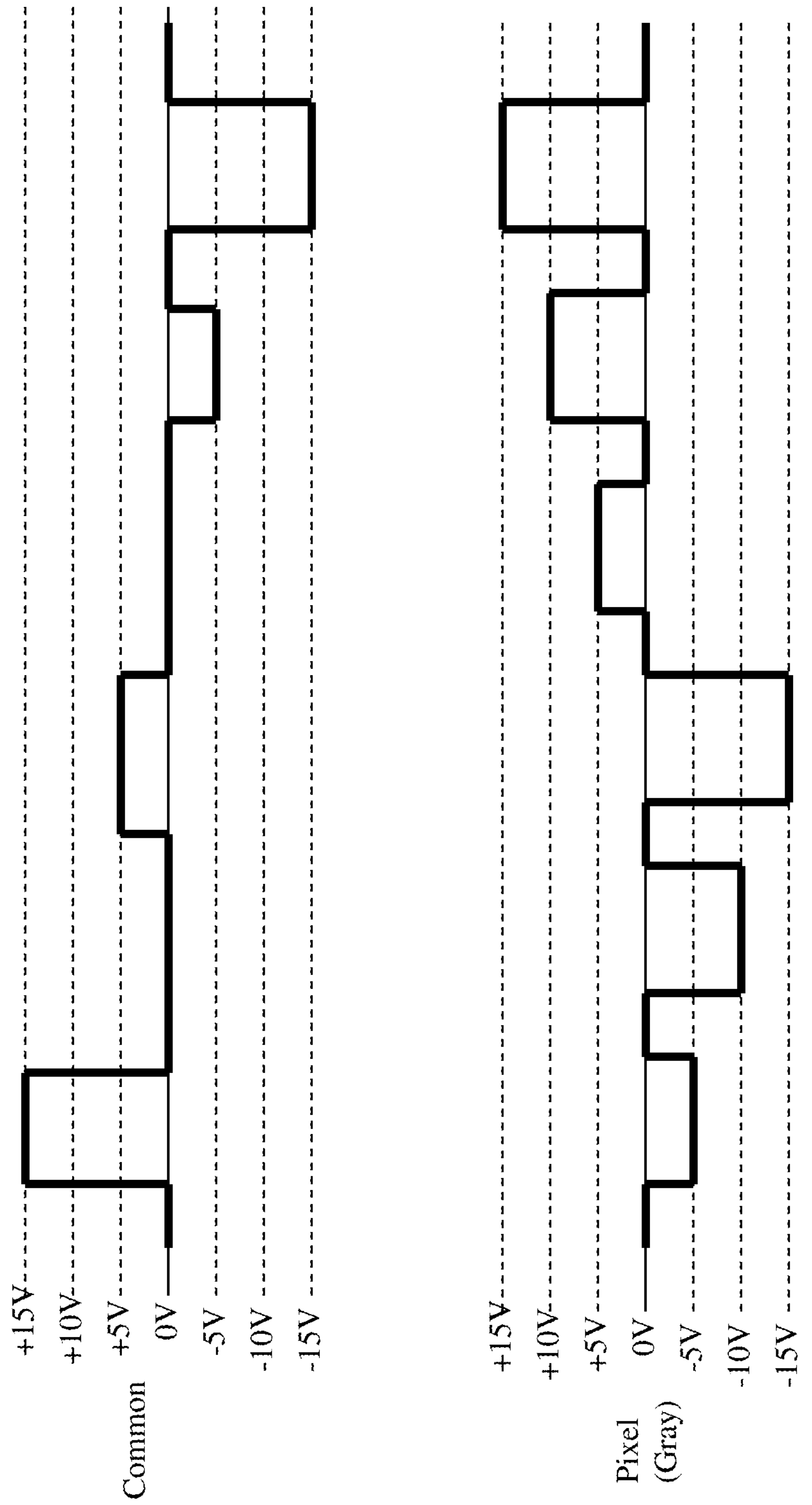
FIG. 3 illustrates an example of an alternative driving method of the present invention.

FIG. 3 shows an alternative driving method of the present invention. In this example, the voltage on the common electrode is also modulated. As a result, the charged particles associated with the pixel electrodes will sense even more levels of potential difference, −30V, −25V, −20V, −15V, −10V, −5V, 0V, +5V, +10V, +15V, +20V, +25V and +30V (see FIG. 4). While more levels of potential difference are sensed by the charged particles, more levels of grayscale may be achieved, thus a finer resolution of the images displayed.

The second aspect of the present invention is directed to a driving method for a color display device. The color display device comprises an electrophoretic fluid, which fluid comprises a first type of pigment particles, a second type of pigment particles and a third type of pigment particles, all of which are dispersed in a solvent or solvent mixture, wherein (a) the first type of pigment particles and the second type of pigment particles carry opposite charge polarities;

(b) the third type of pigment particles has the same charge polarity as the second type of pigment particles but at a lower intensity; and (c) the second type of pigment particles has a threshold voltage.

The first type of pigment particles and the second type of pigment particles may be white and black respectively, or vice versa. In this case, the third type of pigment particles is colored pigment particles which are non-white and non-black. The colored pigment particles may be red, green, blue, yellow, magenta or cyan.

Example 1

Figure 5:
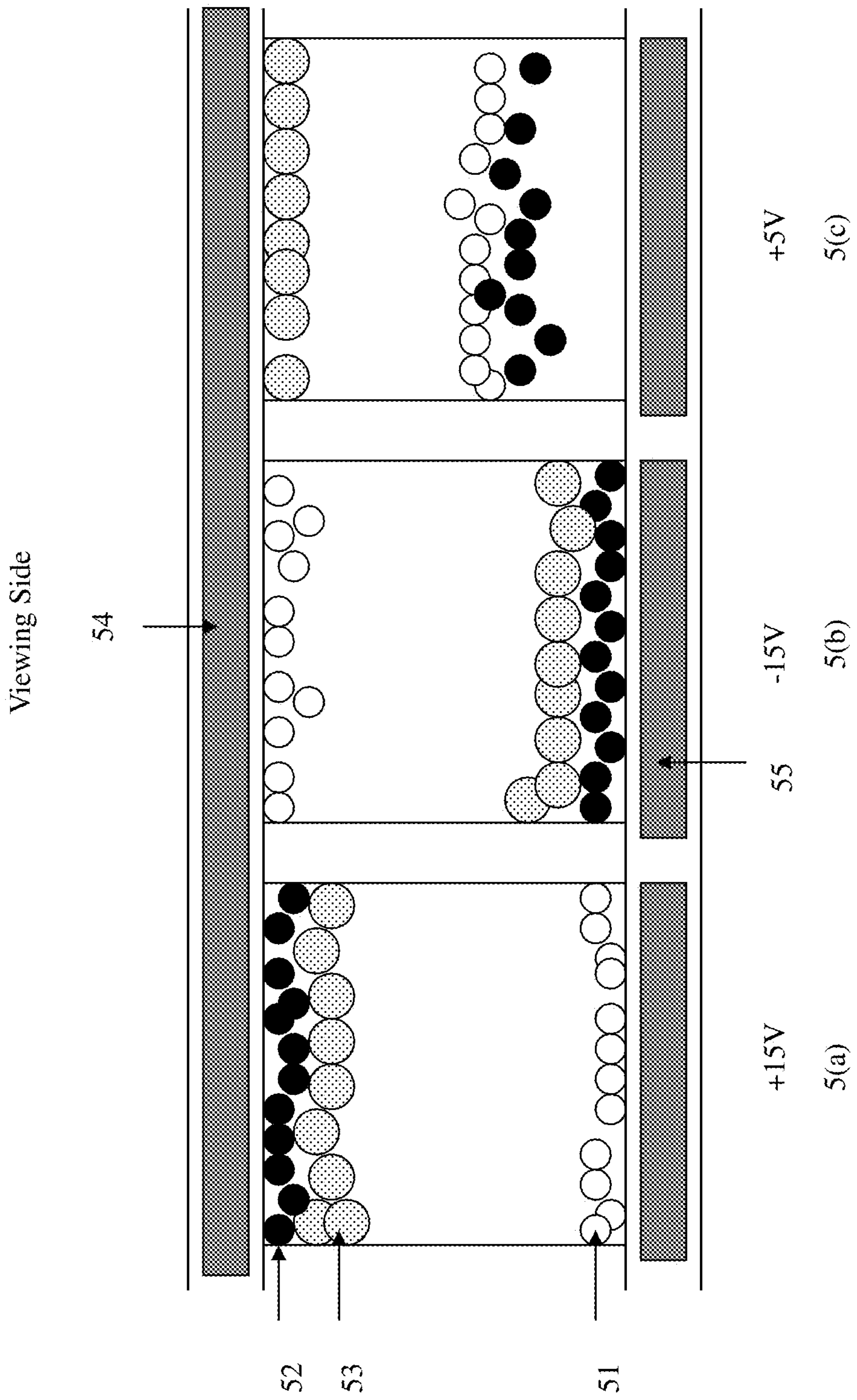
FIGS. 5 and 6 show driving sequences for color display devices.

In FIG. 5, the white pigment particles (51) are negatively charged while the black pigment particles (52) are positively charged.

Because of the attraction between the positively charged black pigment particles (52) and the negatively charged white pigment particles (51), there is a threshold voltage of 5V. Due to the threshold voltage, the black particles (52) would not move to the viewing side if an applied voltage potential difference is 5V or lower.

The colored particles (53) carry the same charge polarity as the black particles which have the threshold voltage, but are slightly charged. The term "slightly charged" is intended to refer to the charge level of the particles being less than about 50%, preferably about 5% to about 30%, the charge intensity of the black or the white particles. As a result, the black particles (52) move faster than the colored particles (53), when an applied voltage potential is higher than the threshold voltage of the black particles because of the stronger charge intensity they carry.

In FIG. 5*a*, the applied voltage potential is +15V. In this case, the white particles (51) move to be near or at the pixel electrode (55) and the black particles (52) and the colored particles (53) move to be near or at the common electrode (54). As a result, the black color is seen at the viewing side. The colored particles (53) move towards the common electrode (54); however because their lower charge intensity, they move slower than the black particles.

In FIG. 5*b*, when a voltage potential difference of −15V is applied, the white particles (51) move to be near or at the common electrode (54) and the black particles and the colored particles move to be near or at the pixel electrode (55). As a result, the white color is seen at the viewing side.

The colored particles (53) move towards the pixel electrode because they are also positively charged. However, because of their lower charge intensity, they move slower than the black particles.

In FIG. 5*c*, the applied voltage potential difference has changed to +5V. In this case, the negatively charged white particles (51) move towards the pixel electrode (55). The black particles (52) move little because of their threshold voltage being 5V. Due to the fact that the colored particles (53) do not have a significant threshold voltage, they move to be near or at the common electrode (54) and as a result, the color of the colored particles is seen at the viewing side.

In this example, the color state is driven from the white state (i.e., FIG. 5*b* to FIG. 5*c*).

Example 2

Figure 6:
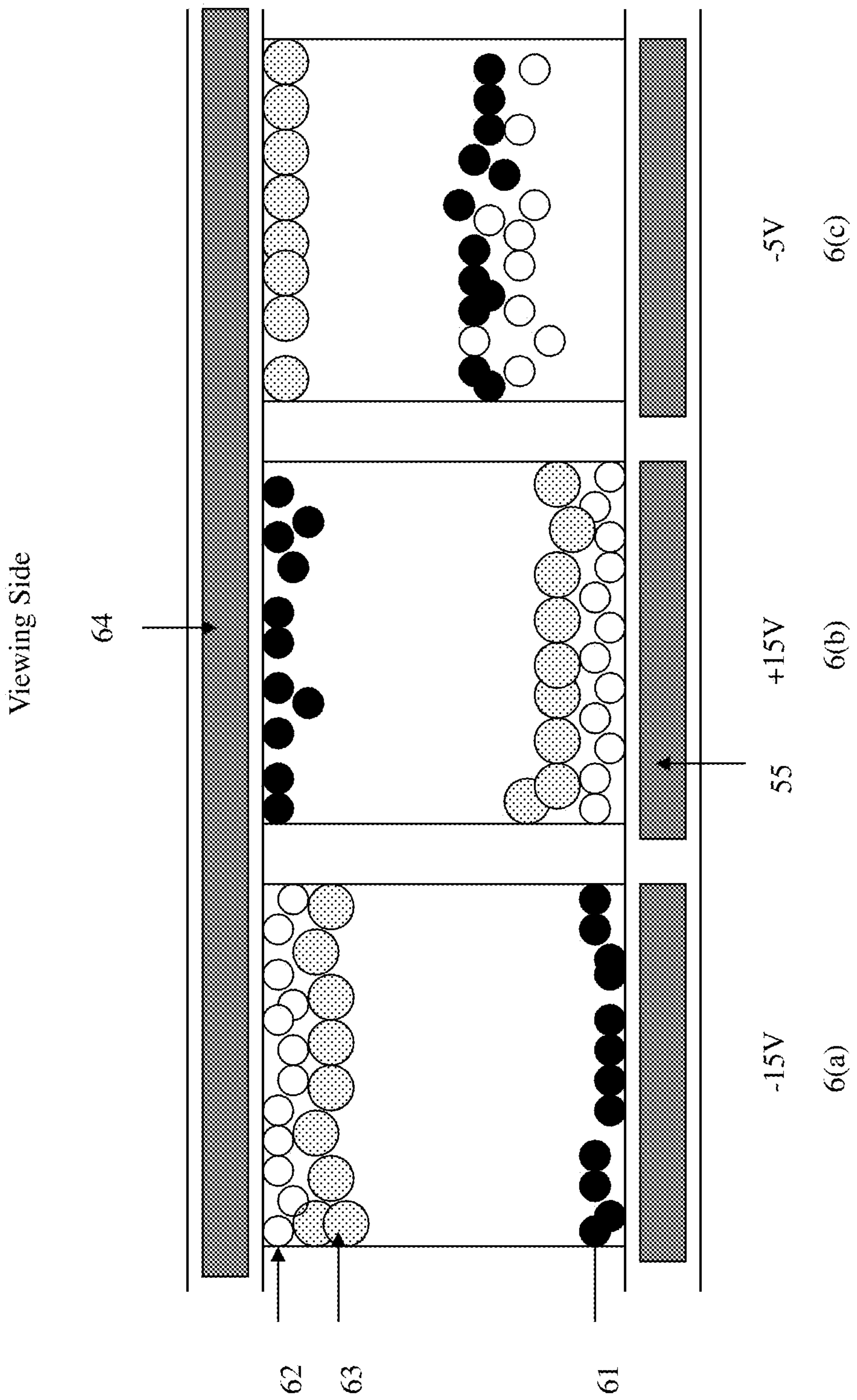

In FIG. 6, the white pigment particles (61) are negatively charged while the black pigment particles (62) are positively charged.

Because of the attraction between the positively charged black pigment particles (62) and the negatively charged white pigment particles (61), there is a threshold voltage of 5V. Due to the threshold voltage, the white particles (61) would not move to the viewing side if an applied voltage potential difference is 5V or lower.

The colored particles (63) carry the same charge polarity as the white particles which have the threshold voltage, but are slightly charged. The term "slightly charged" is as defined above.

In FIG. 6*a*, when a voltage potential difference of −15V is applied, the white particles (61) and the colored particles (63) move to be near or at the common electrode (64) and the black particles (62) move to be near or at the pixel electrode (65). As a result, the white color is seen at the viewing side. The colored particles (63) move towards the common electrode (64); however because their lower charge intensity, they move slower than the white particles.

In FIG. 6*b*, the applied voltage potential difference is +15V. In this case, the white particles (61) and the colored particles (63) move to be near or at the pixel electrode (65) and the black particles (62) move to be near or at the common electrode (64). As a result, the black color is seen at the viewing side.

In FIG. 6*c*, the applied voltage potential difference has changed to −5V. In this case, the white particles (61) move little because of their threshold voltage being 5V. Due to the fact that the colored particles (63) do not have a significant threshold voltage, they move to be near or at the common electrode (64) and as a result, the color of the colored particles is seen at the viewing side.

In this example, the color state is driven from the black state (i.e., FIG. 6*b* to FIG. 6*c*).

Therefore, depending on the color state displayed, the pixel electrode is applied a voltage selected from the group consisting of (i) 0 volt, (ii) a high positive voltage (e.g., +15V), (iii) a high negative voltage (e.g., −15V), and (iv) a low positive voltage (+5V) or a low negative voltage (−5V). In this scenario, no voltage is applied to the common electrode.

It is also possible to modulate the voltage applied to the common electrode and apply voltages to the pixel electrode to achieve the voltage potential differences required.

The magnitude of the "low" positive or negative voltage is about 5% to 50% of the magnitude of the "high" positive or negative voltage. For example, if a "high" positive voltage is +10 V, then a "low" positive voltage is +0.5-5 V More details of the color display device are described in U.S. application Ser. Nos. 13/875,145 and 13/633,788; the contents of which are incorporated herein by reference in their entirety.

The common electrode and the pixel electrodes are separately connected to two individual circuits and the two circuits in turn are connected to a display controller. In practice, the display controller issues signals to the circuits to apply appropriate voltages to the common and pixel electrodes respectively. More specifically, the display controller, based on the images to be displayed, selects appropriate waveforms and then issues signals, frame by frame, to the circuits to execute the waveforms by applying appropriate voltages to the common and pixel electrodes. The term "frame" represents timing resolution of a waveform.

Although the foregoing disclosure has been described in some detail for purposes of clarity of understanding, it will be apparent to a person having ordinary skill in that art that certain changes and modifications may be practiced within the scope of the appended claims. It should be noted that there are many alternative ways of implementing both the process and apparatus of the improved driving scheme for an electrophoretic display, and for many other types of displays including, but not limited to, liquid crystal, rotating ball, dielectrophoretic and electrowetting types of displays. Accordingly, the present embodiments are to be considered as exemplary and not restrictive, and the inventive features are not to be limited to the details given herein, but may be modified within the scope and equivalents of the appended claims.

What is claimed is:

1. A driving method for driving a color display device, which display device comprises an electrophoretic fluid sandwiched between a common electrode and a layer of pixel electrodes and the electrophoretic fluid comprises a first type of pigment particles, a second type of pigment particles and a third type of pigment particles, all of which are dispersed in a solvent or solvent mixture, wherein (a) the first type of pigment particles and the second type of pigment particles carry opposite charge polarities;

(b) the third type of pigment particles has the same charge polarity as the second type of pigment particles but at a lower intensity; and (c) the second type of pigment particles has a threshold voltage, the method comprising:

applying to a pixel electrode a voltage of a high positive voltage;

applying to the pixel electrode a voltage of a high negative voltage; and applying to the pixel electrode a voltage of a low positive voltage or a low negative voltage, which is equal to or lower than the threshold voltage, wherein when the low positive voltage or low negative voltage having the same polarity as the second type of pigment particles is applied to the pixel electrode, a voltage potential difference between the common electrode and the pixel electrode drives an area corresponding to the pixel electrode to a color state of the third type of pigment particles, at a viewing side, from a color state of the first type of pigment particles.

2. The driving method of claim 1, wherein the first type of pigment particles and the second type of pigment particles are black and white respectively, or vice versa.

3. The driving method of claim 2, wherein the third type of pigment particles is non-white and non-black.

4. The driving method of claim 3, wherein the third type of pigment particles is red, green, blue, yellow, magenta or cyan.

5. The driving method of claim 1, wherein no voltage is applied to the common electrode.

6. The driving method of claim 1, wherein the magnitude of the low positive or negative voltage is about 5% to about 50% of the magnitude of the high positive or negative voltage.

7. The driving method of claim 1, wherein the first type of pigment particles is negatively charged and the second and third type of pigment particles are positively charged, when the high positive voltage is applied to a pixel electrode, the voltage potential difference between the common electrode and the pixel electrode drives an area corresponding to the pixel electrode to the color state of the second type of pigment particles, at the viewing side; or when the high negative voltage is applied to a pixel electrode, the voltage potential difference between the common electrode and the pixel electrode drives an area corresponding to the pixel electrode to the color state of the first type of pigment particles, at the viewing side; or when the low positive voltage is applied to a pixel electrode, the voltage potential difference between the common electrode and the pixel electrode drives an area corresponding to the pixel electrode to the color state of the third type of pigment particles, at the viewing side, from the color state of the first type of pigment particles.

8. The driving method of claim 1, wherein the first type of pigment particles is positively charged and the second and third type of pigment particles are negatively charged, when the high positive voltage is applied to a pixel electrode, the voltage potential difference between the common electrode and the pixel electrode drives an area corresponding to the pixel electrode to the color state of the first type of pigment particles, at the viewing side; or when the high negative voltage is applied to a pixel electrode, the voltage potential difference between the common electrode and the pixel electrode drives an area corresponding to the pixel electrode to the color state of the second type of pigment particles, at the viewing side; or when the low negative voltage is applied to a pixel electrode, the voltage potential difference between the common electrode and the pixel electrode drives an area corresponding to the pixel electrode to the color state of the third type of pigment particles, at the viewing side, from the color state of the first type of pigment particles.

* * * * *